S. R. NICHOLS.
ANIMAL TAG.
APPLICATION FILED JUNE 6, 1919.
1,347,868.
Patented July 27, 1920.
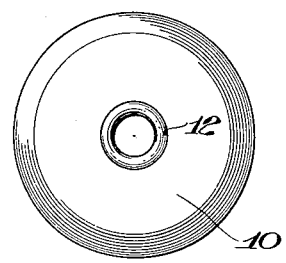
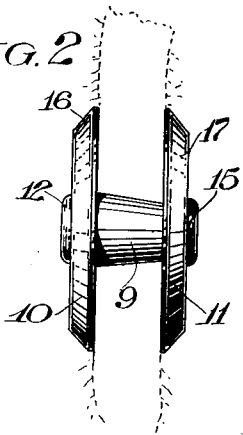
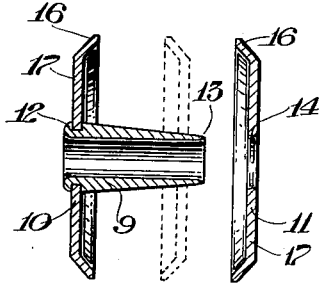
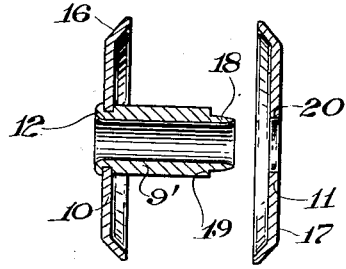
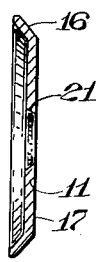
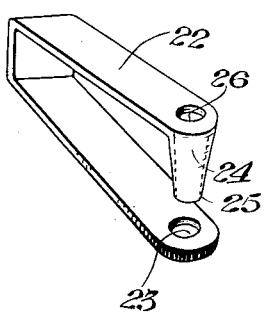
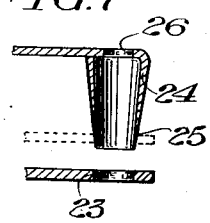
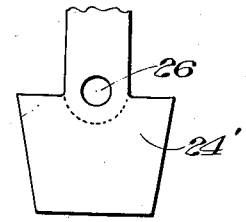
WITNESSES.
H. D. Chase
C. L. Waal
INVENTOR
Samuel R. Nichols
By R. S. Caldwell
ATTORNEY

UNITED STATES PATENT OFFICE.

SAMUEL R. NICHOLS, OF MADISON, WISCONSIN.

ANIMAL-TAG.

1,347,868.                    Specification of Letters Patent.     Patented July 27, 1920.

Application filed June 6, 1919. Serial No. 302,332.

*To all whom it may concern:*

Be it known that I, SAMUEL R. NICHOLS, a citizen of the United States, and resident of Madison, in the county of Dane and State of Wisconsin, have invented new and useful Improvements in Animal-Tags, of which the following is a description, reference being had to the accompanying drawings, which are a part of this specification.

The invention relates to identification tag for animals, more particularly for stock animals, and one which is directly attached to the animal.

In devices of this kind at present in use, due to the construction of the tag it frequently pulls loose from the ear or other portion of the body of the animal to which it is attached and it is one of the essential objects of this invention to provide a tag which will be firmly and positively held in place even though the animal attempts to dislodge it.

Another object of the invention is to provide a tag of this character which is devoid of surfaces apt to catch in obstructions.

The invention further consists in the several features hereinafter set forth and more particularly defined by claims at the conclusion hereof.

In the drawings: Figure 1 is a detail plan view of a tag embodying the invention; Fig. 2 is a view of the tag in attached position; Fig. 3 is a sectional view of the tag with the parts ready for attachment; Fig. 4 is a view similar to Fig. 3, showing a slightly changed construction; Fig. 5 is a detail view of a modified construction of one of the parts which may be used with the other part shown in Fig. 4; Fig. 6 is a perspective view of a modified form of tag; Fig. 7 is a vertical sectional view through the securing end of this tag; Fig. 8 is an expanded view of one of the ends of this tag, showing it prior to being bent to shape.

Referring to Figs. 1 to 5 inclusive, in each instance the identifying tag consists of clamping members in which a snank, carried by one of the members, has a portion adapted to be riveted or crimped over the other member, the shank being hollow and having a cutting edge to pierce and cut through the flesh of the animal where it is to be attached prior to securing the detached member upon the shank. In Figs. 1 to 3 inclusive a hollow tubular shank 9 is fixedly secured to a member 10 at one end and is adapted to be secured to a similar member 11 at its other end. These members 10 and 11 are dished on their inner sides so that they may be brought up against the flesh of the animal and still permit the hair within the disk to grow. The end 12 of the shank 9 is fixedly secured to the member 10 by riveting it on to said member and from this member the shank tapers downwardly to a relatively sharp ring edge 13. The sharpened end is pressed through the flesh of the animal and then through the tapered opening 14 in the member 11, said member 11 being pressed toward the member 10 to firmly secure the flesh between the two and then the end 13 is upset or crimped over the member 11 as shown at 15 in Fig. 2, thus firmly riveting the parts together. The beveled faces 16 of the members with the flat sides 17 provide a construction which will not readily be caught in obstructions which the animal may encounter and consequently there is little liability that a tag of this kind will pull out, and, in fact, since the parts are riveted together, there is no liability for the tag coming off, so that the identification of the animal is preserved.

In Fig. 4 the member 10 is secured to a shank 9′ in a manner similar to that shown in Fig. 3, but in this case the shank 9′ is not tapered the full length but has a short tapered end 18 with a shoulder 19 adjacent said end and the member 11 may have a straight hole 20, as shown in Fig. 4, or a tapered hole 21, as shown in Fig. 5, to receive the tapered end 18 of the shank 9′ when the device is applied to the animal, the tapered end 18 in each instance then being upset over the face of the member 11 adjacent the opening thereto to firmly secure the members 10 and 11 to the shank with the flesh of the animal interposed between them. In this construction the shoulder 19 forms a stop to limit the movement of the member 11 on the shank.

In Figs. 6 to 8 inclusive I have shown a form of tag in which instead of using separate clamping members a U-shaped member 22 is employed having an opening 23 in one end to receive a shank 24 formed on the other end of this member, said shank 24 having a tapered cutting edge 25 adapted to pass through the opening 23 and be upset over the end in which this opening is located in a manner similar to that shown in the previous constructions, there being an opening 26 in line with the tubular end 24 for the purpose of lining up the parts and securing them in place by a suitable tool.

The tag in this instance is formed from a single blank in which the portion 24' of Fig. 8 shows the end of this shank before it is bent down into the tubular form 24, shown in Figs. 6 and 7. In this construction the tubular portion 24 passes through the flesh of the animal and is then secured to the other side of the member 22 so as to firmly secure the tag in place.

In the constructions shown in Figs. 1 to 5 inclusive the outer faces of the clamping members may have the name of the owner, his address and any particular designation of the animal impressed therein, while in Figs. 6 to 8 inclusive such identification marks are placed on the outside of the arms of the member 22.

In both of the above constructions it will be noted that the shank is hollow and this is an important feature of my invention as it permits of a sharp cutting edge with considerable securing surface and the use of a tool which has alined centers insertible in the openings at the ends of this shank to draw the parts together and then crimp them in position.

The tags above described are simple in construction, may be readily and securely attached to the animal and are not apt to be torn loose by the animal encountering obstructions.

The openings 14 and 21 in the members 11 are made of tapered form so that as the shank passes through the ear and enters the opening in the member 11, the passage of the end of this shank through said opening is facilitated and a snug fit between the shank and the member 11 is obtained.

What I claim as new and desire to secure by Letters Patent is:

1. An animal identification tag provided with parts adapted to receive between them a portion of the flesh of the animal, a tubular shank connected with one of the parts and having its outer surface tapering from the part to which it is connected to its end and meeting its inner bore at the end to form an annular cutting edge of the same diameter as its bore, said tapered end being insertible through the flesh and through an opening in the other part against which it is upset and firmly held.

2. An animal identification tag comprising a U-shaped member, a tubular shank integral with one of the arms of said member and having its outer surface tapering from the arm to its end and meeting its inner bore to form an annular cutting edge of the same diameter as its bore, said tapered end being insertible through the flesh and through an opening in the other end of the arm against which it is crimped and firmly held.

In testimony whereof, I affix my signature, in presence of two witnesses.

SAMUEL R. NICHOLS.

Witnesses:
FRANK R. VAN KEUREN,
F. L. SMITH.